United States Patent
Cheng

(10) Patent No.: US 10,363,512 B2
(45) Date of Patent: Jul. 30, 2019

(54) FILTER CYLINDER HAVING DUST CLEANING DEVICE OF DUST COLLECTOR

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

(*) Notice: Subject to any disclaimer, the term of this patent is extended or adjusted under 35 U.S.C. 154(b) by 189 days.

(21) Appl. No.: 15/607,819

(22) Filed: May 30, 2017

(65) Prior Publication Data

US 2018/0345199 A1  Dec. 6, 2018

(51) Int. Cl.
- *B01D 46/00* (2006.01)
- *B01D 46/52* (2006.01)
- *B01D 46/24* (2006.01)
- *B01D 50/00* (2006.01)

(52) U.S. Cl.
CPC ....... *B01D 46/521* (2013.01); *B01D 46/0075* (2013.01); *B01D 46/2403* (2013.01); *B01D 46/523* (2013.01); *B01D 50/002* (2013.01)

(58) Field of Classification Search
CPC .............. B01D 46/00; B01D 46/0075; B01D 46/2403; B01D 46/521–527; B01D 50/002

USPC .......................................................... 55/300
See application file for complete search history.

(56) References Cited

U.S. PATENT DOCUMENTS

| | | | | |
|---|---|---|---|---|
| 4,661,129 | A | * | 4/1987 | Nederman ......... B01D 46/0075 55/283 |
| 2005/0183233 | A1 | * | 8/2005 | Lin .......................... A47L 5/38 15/352 |
| 2015/0113929 | A1 | * | 4/2015 | Jackson ............... B01D 46/523 55/487 |

* cited by examiner

*Primary Examiner* — T. Bennett McKenzie
(74) *Attorney, Agent, or Firm* — Sinorica, LLC

(57) ABSTRACT

A filter cylinder having a dust cleaning device of a dust collector is provided. The filter cylinder has a cylindrical outer frame. An HEPA filter is provided inside the filter cylinder. The inner wall of the filter is provided with a collar. A cleaning device is disposed in the filter cylinder. The cleaning device includes a bracket. Two ends of the bracket are each provided with a flap member corresponding to the inner wall of the collar. The cleaning device is rotatable in the filter cylinder, with the flap member to flap the collar and further to vibrate the filter, so that the dust adsorbed to the filter drops from the filter to enhance the structural strength of the filter and to prolong the service life of the filter.

3 Claims, 8 Drawing Sheets

US 10,363,512 B2

FILTER CYLINDER HAVING DUST CLEANING DEVICE OF DUST COLLECTOR

FIELD OF THE INVENTION

The present invention relates to a dust collector, and more particularly to a filter cylinder having a dust cleaning device of a dust collector.

BACKGROUND OF THE INVENTION

In the workplace where chips or dust are prone to occur, such as a woodworking plant, there is usually a dust collector used for maintaining the quality of the air and cleaning the environment. The dust collector collects chips and dust in the workplace to avoid chips and dust flying in the air so as to ensure the safety of the workplace and to facilitate the follow-up cleaning.

Referring to FIG. 1, a conventional dust collector includes a main body 1, a dust collection cylinder 2, and a filter cylinder 3. A filter 4 is provided in the filter cylinder 3. An exhauster 5 is disposed above the main body 1. The airflow with dust is sucked into the main body 1 through the exhauster 5. The heavy dust falls into the dust collection cylinder 2 due to gravity. The light dust is sucked to the filter 3 through the exhauster 5. A guide rod 6 and a flap member 7 are provided in the filter cylinder 3. The top of the guide rod 6 is provided with a handle 8. Through the handle 8, the guide rod 6 and the flap member 7 are driven to rotate in the filter cylinder 3, so that one end of the flap member 7 can flap the filter 4, thereby cleaning the filter cylinder 3 quickly.

However, the above-mentioned conventional filter 4 is a High-Efficiency Particulate Air (HEPA) filter, which is capable of filtering dust of PM2.5. A filtration film is attached to the inner wall of the filter 4. When the flap member 7 is rapidly rotated to flap the filter 4, the filtration film on the inner wall of the filter 4 is liable to be damaged and the filtering effect of the filter 4 is lowered. As a result, the service life of the filter 4 is shortened. Accordingly, the inventor of the present invention has devoted himself based on his many years of practical experiences to solve these problems.

SUMMARY OF THE INVENTION

The primary object of the present invention is to provide a filter cylinder having a dust cleaning device of a dust collector to enhance the structural strength of a filter and to protect a filtration film on the inner wall of the filter.

In order to achieve the aforesaid object, a filter cylinder having a dust cleaning device of a dust collector is provided. The dust collector includes the filter cylinder. The filter cylinder has a cylindrical outer frame. A high-efficiency particulate air (HEPA) filter is provided inside the filter cylinder. The filter is in the form of a cylinder. An outer peripheral wall of the filter is formed with a plurality of zigzag edges. An inner peripheral wall of the filter is formed with first zigzag tips corresponding to the zigzag edges. A cleaning device is axially provided in the filter cylinder. The cleaning device includes a guide rod and a bracket. Two ends of the bracket are each provided with a flap member. An upper end of the guide rod is provided with a handle. The cleaning device is driven to rotate in the filter cylinder by the handle. At least one collar is disposed on an inner wall of the filter cylinder and corresponds in position to the flap member. The collar is formed with second zigzag tips corresponding to and attached to the first zigzag tips. One end of the flap member is located between two of the second zigzag tips.

When the guide rod is rotated by the handle, the flap member is rotated in the filter cylinder to flap the collar and further to vibrate the filter so that dust adsorbed to the filter drops from the filter. The present invention can enhance the structural strength of the filter and protect the filtration film on the inner wall of the filter and prolong the service life of the filter.

DETAILED DESCRIPTION OF THE PREFERRED EMBODIMENTS

Figure 1:
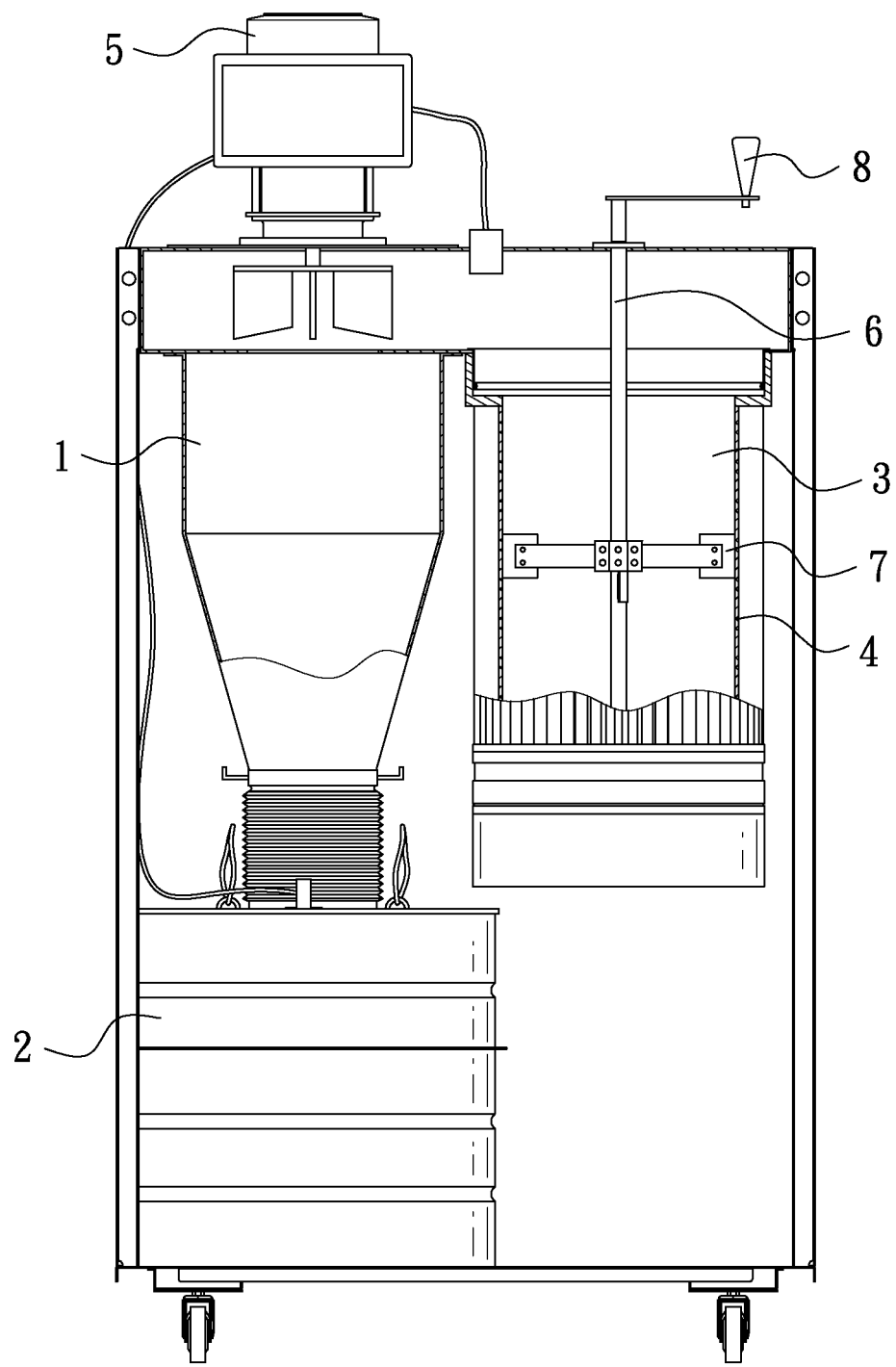
FIG. 1 is a partial sectional view of a conventional dust collector.

Embodiments of the present invention will now be described, by way of example only, with reference to the accompanying drawings.

As shown in FIG. 2 to FIG. 6, the present invention discloses a filter cylinder having a dust cleaning device of a dust collector. A dust collector 100 comprises a main body 10, a dust collection cylinder 20, a filter cylinder 30, at least one collar 40, a cleaning device 50, and an exhauster 60.

The outer circumferential wall of the main body 10 is provided with an air inlet 11. The air inlet 11 is connected with a dust collection tube 200. Upper and lower ends of the main body 10 are formed with a first air outlet 12 and a second air outlet 13, respectively.

The dust collection cylinder 20 is connected with the first air outlet 11 of the main body 10 for storing dust falling from the man body 10.

The filter cylinder 30 is connected with the second air outlet 13 of the main body 10. The filter cylinder 30 has a cylindrical outer frame 31. A filter 32 is provided inside the filter cylinder 30. The filter 32 is a high-efficiency particulate air (HEPA) filter. A filtration film is attached to the inner wall of the filter 32. The filter 32 is capable of filtering out dust of PM2.5. The filter 32 is in the form of a cylinder. An outer peripheral wall of the filter 32 is formed with a plurality of zigzag edges 33, and an inner peripheral wall of the filter 32 is formed with first zigzag tips 34 corresponding to the zigzag edges 33, thereby enhancing the effect of filtering dust.

The collar 40 is disposed in the filter 32 of the filter cylinder 30. The collar 40 is in a circular shape. The collar 40 is formed with second zigzag tips 41 corresponding to the first zigzag tips 34. The collar 40 is fixed to the filter 32 by bonding.

The cleaning device 50 is disposed in the filter cylinder 30. The cleaning device 50 is located at the center of the filter cylinder 30. The cleaning device 50 includes a guide rod 51 and at least one bracket 52. The bracket 52 is transversely disposed on the guide rod 51. Two ends of the bracket 52 are each provided with a flap member 53. The flap member 53 corresponds in position to the collar 40, and is located between two of the second zigzag tips 41.

The exhauster 60 is disposed above the main body 10. The exhauster 60 includes a motor 61. The motor 61 is connected with a fan 62 to form an air flow in the main body 10.

Figure 2:
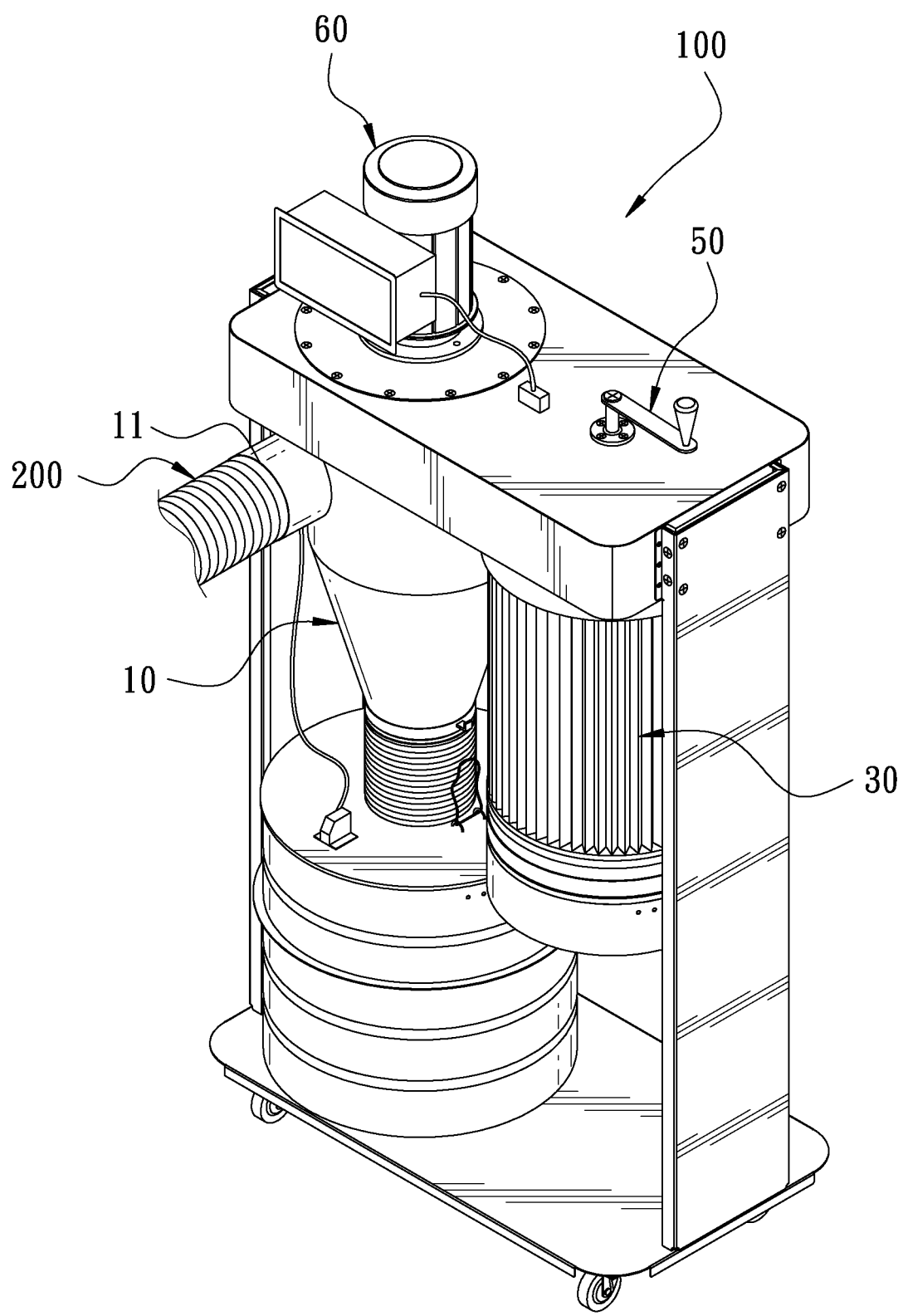
FIG. 2 is a perspective view in accordance with a preferred embodiment of the present invention.
Figure 3:
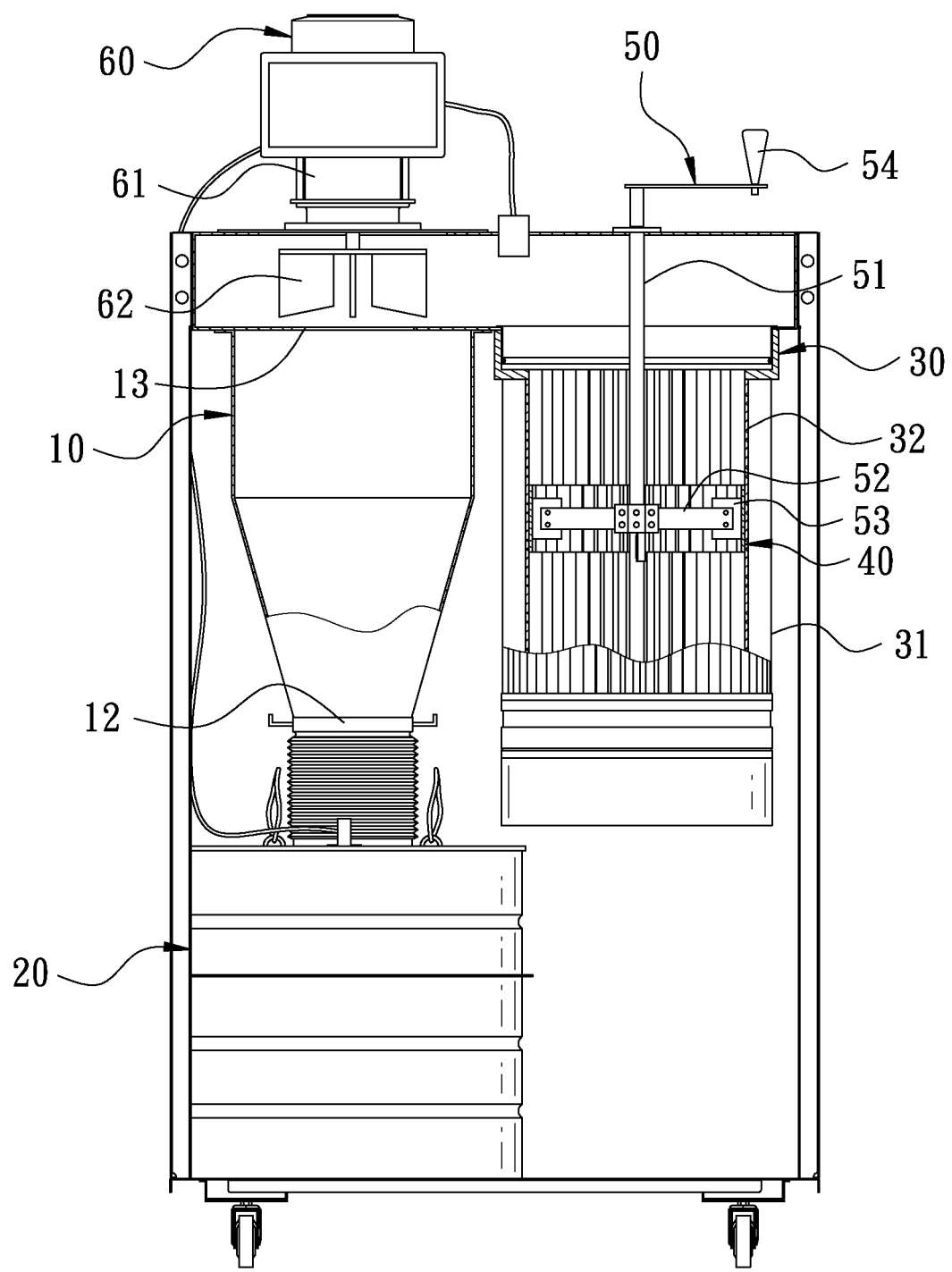
FIG. 3 is a partial sectional in accordance with the preferred embodiment of the present invention.
Figure 4:
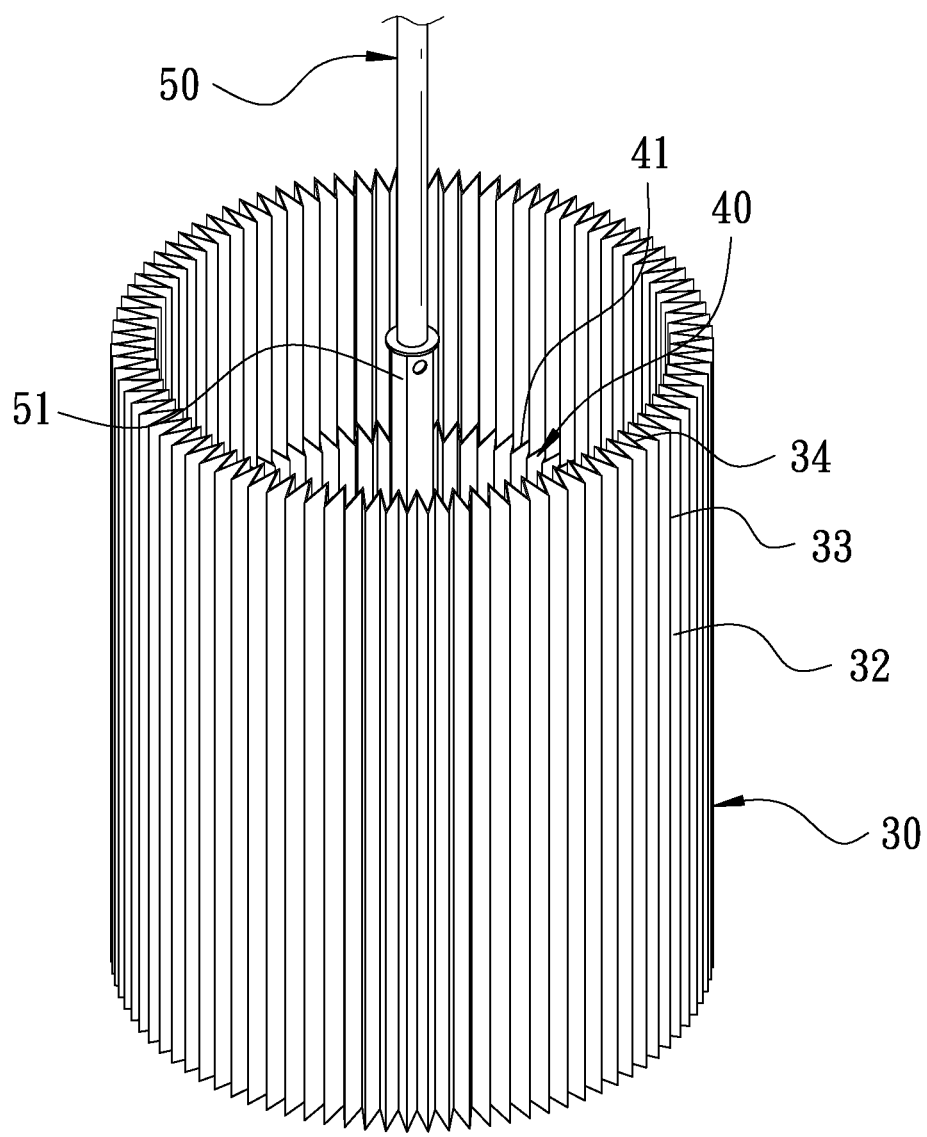
FIG. 4 is a perspective view of the filter cylinder and the cleaning device of the present invention.
Figure 5:
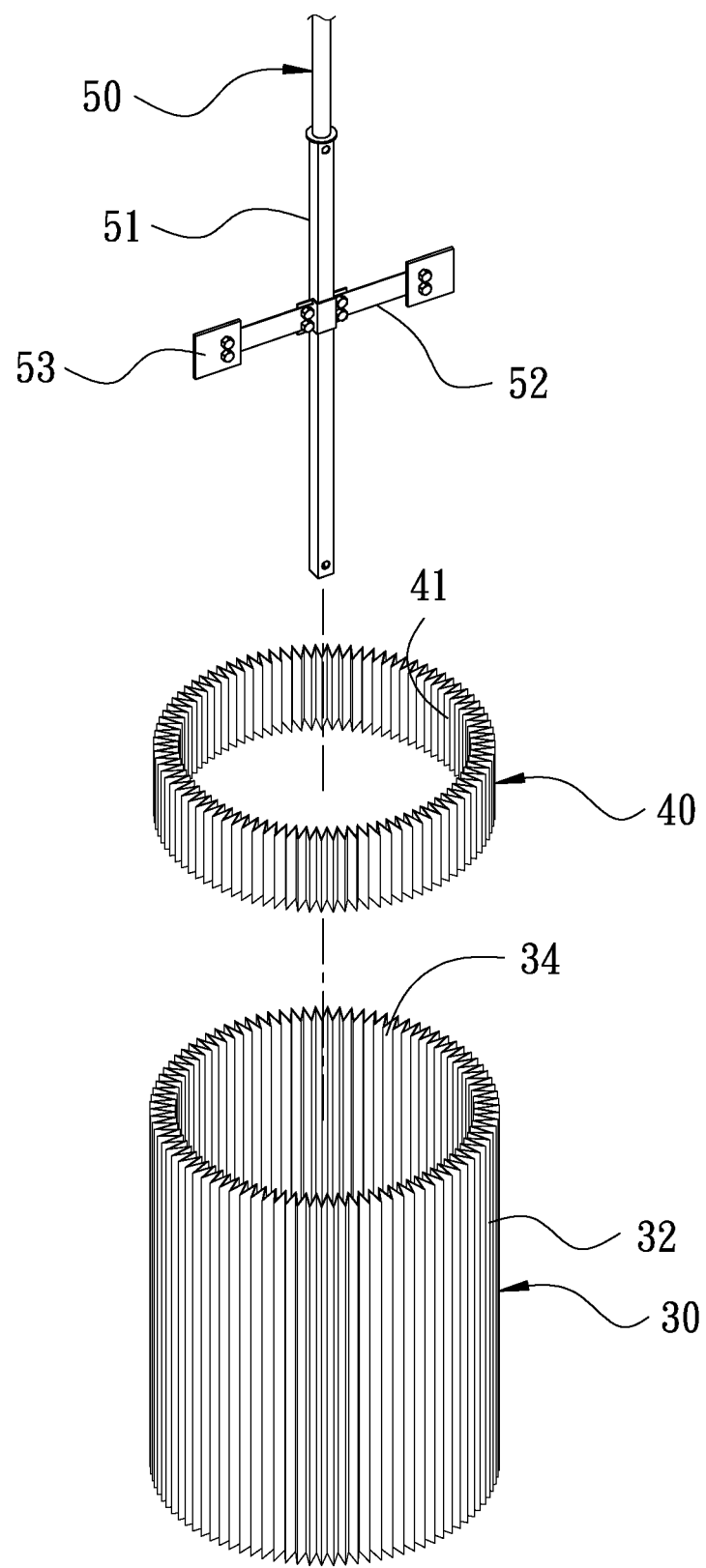
FIG. 5 is an exploded view of the filter cylinder and the cleaning device of the present invention.
Figure 6:
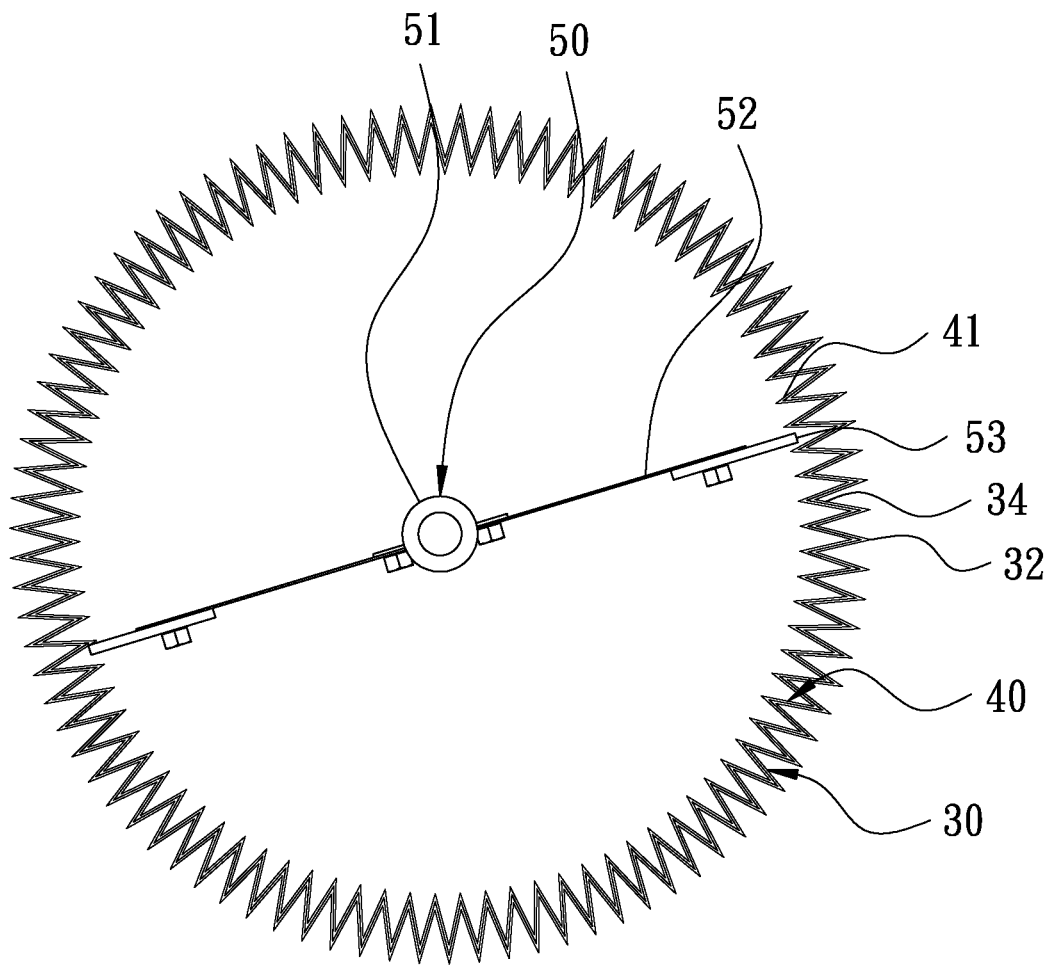
FIG. 6 is a top view of the filter cylinder and the cleaning device of the present invention.
Figure 7:
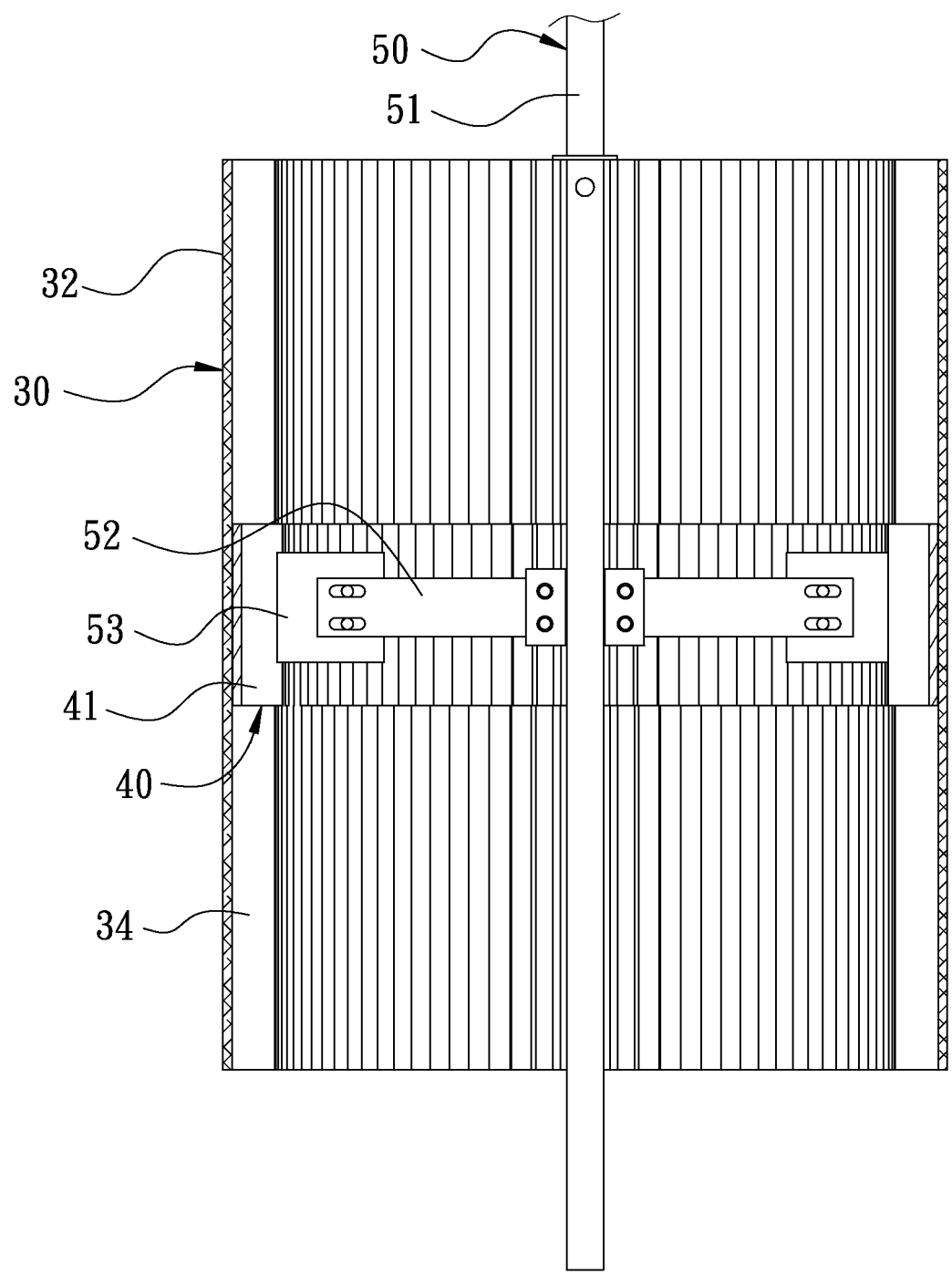
FIG. 7 is a front sectional view of the filter cylinder and the cleaning device in accordance with a first embodiment of the present invention.

Referring to FIG. 2 and FIG. 3, the dust collection tube 200 is connected to the air inlet 11 of the main body 10. The airflow with dust is sucked into the main body 10 through the exhauster 60 for collecting dust. The heavy dust falls into the dust collection cylinder 20 due to gravity. The light dust is affected by the airflow and suck to the filter 30, so that the light dust is adsorbed to the inner wall of the filter 32 of the filter cylinder 30 to achieve the effect of filtering dust.

Referring to FIG. 4 to FIG. 7, when the dust collector 100 is used for a period of time, the guide rod 51 and the flap member 53 can be driven by the handle 54 to rotate in the filter cylinder 30. One end of the flap member 53 is located between two of the second zigzag tips 41 of the collar 40. When the flap member 53 is rotated, the flap member 53 will flap the second zigzag tips 41 of the collar 40 and further to vibrate the filter 32, so that the dust adsorbed to the filter 32 drops from the filter 32.

The filter cylinder 30 is provided with the filter 32 which is able to filter out dust of PM2.5. The filtration film is attached to the inner peripheral wall of the filter 32. The inner peripheral wall of the filter 32 is formed with the first zigzag tips 34 for increasing the area of the filter 32 to adsorb dust. The second zigzag tips 41 of the collar 40 correspond to the first zigzag tips 34 of the filter 32. The second zigzag tips 41 and the first zigzag tips 34 are secured to each other by bonding. The collar 40 is made of resilient anti-abrasive paper to enhance the structural strength of the filter 32, so that when the flap member 53 flaps the collar 40, the filtration film on the inner wall of the filter 32 won't be damaged, thereby prolonging the service life of the filter 32.

Figure 8:
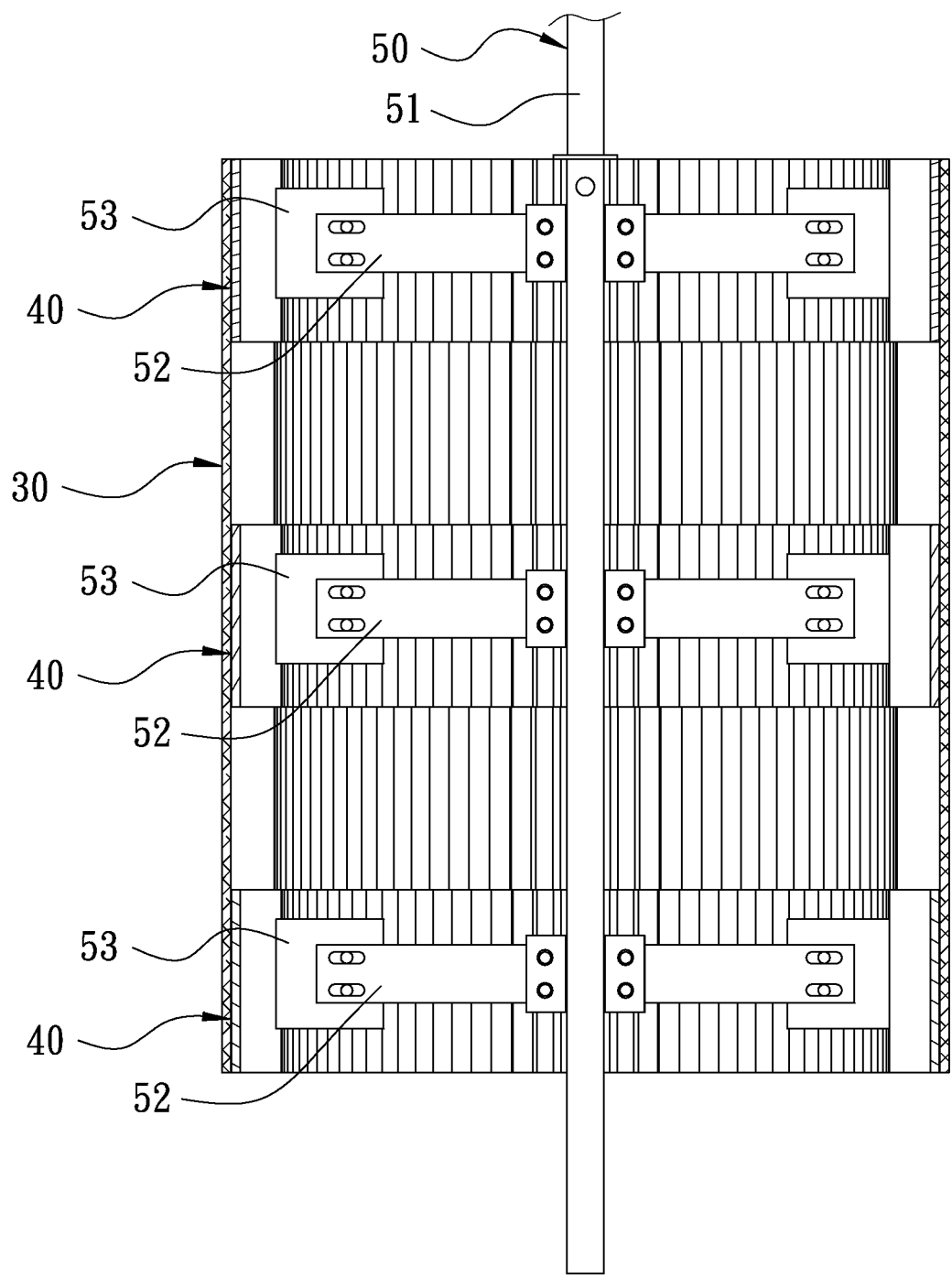
FIG. 8 is a front sectional view of the filter cylinder and the cleaning device in accordance with a second embodiment of the present invention.

FIG. 8 is a front sectional view of the filter cylinder 30 and the cleaning device 50 in accordance with a second embodiment of the present invention. The filter cylinder 30 is provided with at least collars 40. The cleaning device 50 is provided with brackets 52 and flap members 53 corresponding to the collars 40. When the cleaning means 50 is rotated, the flap members 53 will flap the collars 40 and further to vibrate the filter 32, so that the dust adsorbed to the filter 32 drops from the filter 32, thereby improving the effect of removing the dust of the filter cylinder 30 by the cleaning device 50.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A filter device for a dust collector, the filter device comprising a cylindrical outer frame and a cylindrical high-efficiency particulate air (HEPA) filter provided inside the cylindrical outer frame, wherein an outer peripheral wall of the cylindrical HEPA filter is formed with a plurality of zigzag edges, and wherein an inner peripheral wall of the cylindrical HEPA filter is formed with first zigzag tips corresponding to the zigzag edges, and wherein the filter device further comprises a cleaning device axially provided in the interior of the cylindrical HEPA filter, and wherein the cleaning device includes a guide rod and a bracket, and wherein two ends of the bracket are each provided with a flap member, and wherein an upper end of the guide rod is provided with a handle, and wherein the cleaning device is operable to be driven to rotate in the interior of the cylindrical HEPA filter by the handle, characterized by that:

at least one collar is disposed on the inner peripheral wall of the cylindrical HEPA filter, wherein the at least one collar corresponds in position to the flap members, and wherein the at least one collar is formed with second zigzag tips corresponding to and attached to the first zigzag tips, one end of the each of the flap members being located between two of the second zigzag tips, and wherein when the guide rod is rotated by the handle, the flap members are rotated to flap the collar and further to vibrate the cylindrical HEPA filter so that dust adsorbed to the cylindrical HEPA filter drops from the cylindrical HEPA filter, and wherein the at least one collar is made of resilient anti-abrasive paper.

2. The filter device as claimed in claim 1, wherein the collar is fixed to the inner peripheral wall of the cylindrical HEPA filter by bonding.

3. The filter device as claimed in claim 1, wherein the cylindrical HEPA filter is capable of filtering out dust of PM2.5.

* * * * *